US012065174B2

(12) United States Patent
Ariannezhad et al.

(10) Patent No.: US 12,065,174 B2
(45) Date of Patent: Aug. 20, 2024

(54) AI-BASED MAP FOR DRIVE-ASSIST SYSTEM AVAILABILITY

(71) Applicant: Ford Global Technologies, LLC, Dearborn, MI (US)

(72) Inventors: Amin Ariannezhad, Troy, MI (US); Navid Tafaghodi Khajavi, Troy, MI (US); Mohsen Bahrami, Birmingham, MI (US); Sajit Janardhanan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 17/460,192

(22) Filed: Aug. 28, 2021

(65) Prior Publication Data
US 2023/0065414 A1    Mar. 2, 2023

(51) Int. Cl.
*B60W 60/00*    (2020.01)
*B60W 50/14*    (2020.01)
*G01C 21/00*    (2006.01)
*G01C 21/36*    (2006.01)
*G05D 1/00*    (2024.01)

(52) U.S. Cl.
CPC .......... *B60W 60/005* (2020.02); *B60W 50/14* (2013.01); *B60W 60/001* (2020.02); *G01C 21/3667* (2013.01); *G01C 21/3815* (2020.08); *G05D 1/0274* (2013.01); *B60W 2050/146* (2013.01)

(58) Field of Classification Search
CPC .. B60W 60/005; B60W 60/001; B60W 50/14; B60W 2050/146; G01C 21/3815; G01C 21/3667; G05D 1/0274
See application file for complete search history.

(56) References Cited

U.S. PATENT DOCUMENTS 7,912,637 B2    3/2011    Horvitz et al.
9,605,970 B1    3/2017    Day et al.
(Continued)

OTHER PUBLICATIONS

Yue Dai et al., "Dynamic Prediction of Drivers' Personal Routes through Machine Learning", IEEE, 2016, eight pages.
(Continued)

*Primary Examiner* — Kenneth J Malkowski
*Assistant Examiner* — Carville Albert Hollingsworth, IV
(74) *Attorney, Agent, or Firm* — Emily Drake; Eversheds Sutherland (US) LLP

(57) ABSTRACT

Routes may be presented to a vehicle operator with information about predicted autonomous driving levels. A road network route to a destination is received. The road network route is partitioned into segments. Indicia of the segments are provided to an inference engine. The inference engine predicts levels of autonomous driving for the respective segments generated by the inference engine based on the indicia of the segments. Based on the predicted levels of autonomous driving for the respective segments, a ratio of a level of autonomous driving for the road network route is computed. The ratio corresponds to a proportion of time and/or distance for the road network route during which a driver-system is predicted to be engaged at the level of autonomous driving. A user interface is displayed, which includes a graphic representation of the road network route and a graphic indication of the ratio.

19 Claims, 11 Drawing Sheets

(56) References Cited

U.S. PATENT DOCUMENTS

| | | |
|---|---|---|
| 9,846,049 B2 | 12/2017 | Krumm |
| 10,410,250 B2 * | 9/2019 | Singhal .............. G01C 21/3484 |
| 2017/0315551 A1 * | 11/2017 | Mimura ................ B60W 30/10 |
| 2017/0370740 A1 * | 12/2017 | Nagy ................. G01C 21/3484 |
| 2020/0143677 A1 | 5/2020 | Scofield |
| 2022/0063639 A1 * | 3/2022 | Stenneth .............. B60W 40/06 |

OTHER PUBLICATIONS

Reid Simmons et al., "Learning To Predict Route and Destination Intent", 2006 IEEE Intelligent Transportation Systems Conference, Toronto, Canada, Sep. 17-20, 2006, six pages.

\* cited by examiner

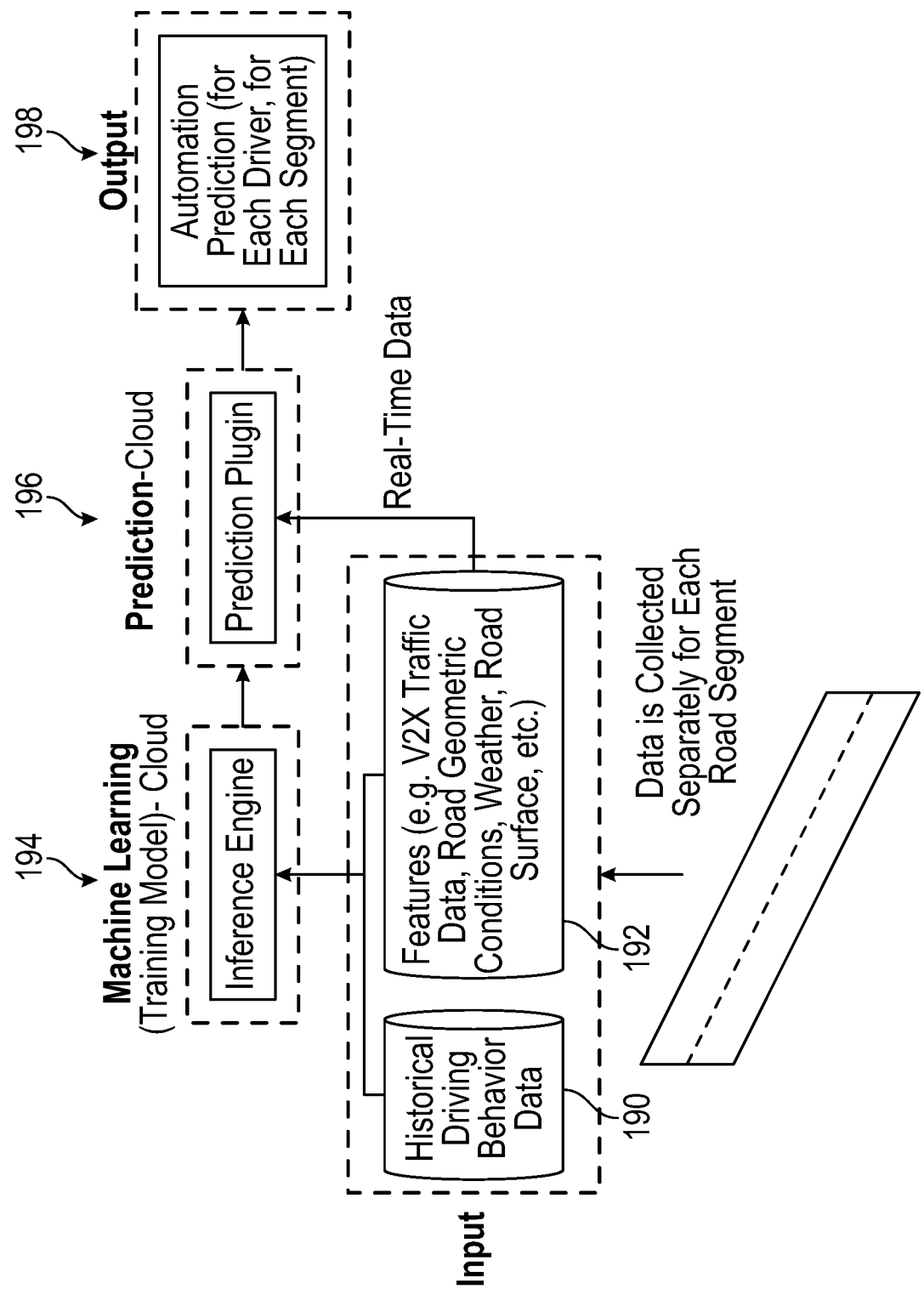

AI-BASED MAP FOR DRIVE-ASSIST SYSTEM AVAILABILITY

BACKGROUND

Recent efforts in the automotive industry have led to the development of different levels of driving automation. Driver assistance, partial automation, conditional automation, high automation, and full automation are examples of different levels of driving automation. Automation levels other than full automation level require at least partial control by a driver. The most common levels in current production vehicles are Driver Assistance (DA) and partial automation. As used herein, the term "driving automation" does not include automated aspects of a vehicle such as anti-lock brake systems, for example, but rather refers to levels of continuous automated control of a vehicle.

Mapping applications can compute candidate routes between an origin and a destination. When a user is about to start a drive from the origin to the destination, the user may specific the destination. The mapping application may derive several candidate routes using various known route-optimization algorithms. Generally, the optimization condition, and eventual user-selection condition, has been travel time, that is, how much time is estimated to be necessary to travel any given route.

BRIEF DESCRIPTION OF THE DRAWINGS

The present description will be better understood from the following detailed description read in light of the accompanying drawings, wherein like reference numerals are used to designate like parts in the accompanying description.

FIG. 6 shows an overview of an embodiment for predicting automation levels in accordance with one or more embodiments of the disclosure.

DETAILED DESCRIPTION

Overview

Embodiments discussed below relate to presenting routes with information about predicted autonomous driving levels. A road network route to a destination is received. The road network route is partitioned into segments. Indicia of the segments are provided to an inference engine. The inference engine predicts levels of autonomous driving for the respective segments generated by the inference engine based on the indicia of the segments. Based on the predicted levels of autonomous driving for the respective segments, a ratio of a level of autonomous driving for the road network route is computed. The ratio corresponds to a proportion of time and/or distance for the road network route during which a driver-system is predicted to be engaged at the level of autonomous driving. A user interface is displayed, which includes a graphic representation of the road network route and a graphic indication of the ratio. For the same destination, multiple road network routes and associated ratios may be displayed from which the user may select.

Discussion will proceed as follows. An EMBODIMENTS section covers embodiments for providing a user with various forms of information about predicted autonomous driving on potential driving routes. This will be followed by a section titled OVERVIEW OF AUTOMATED DRIVING PREDICTION, which summarizes aspects of automated driving prediction that are relevant to the embodiments. The next section, titled SYSTEMS FOR AUTOMATED DRIVING PREDICTION, provides a detailed explanation of ways that automated driving prediction may be implemented.

EMBODIMENTS

Figure 1:
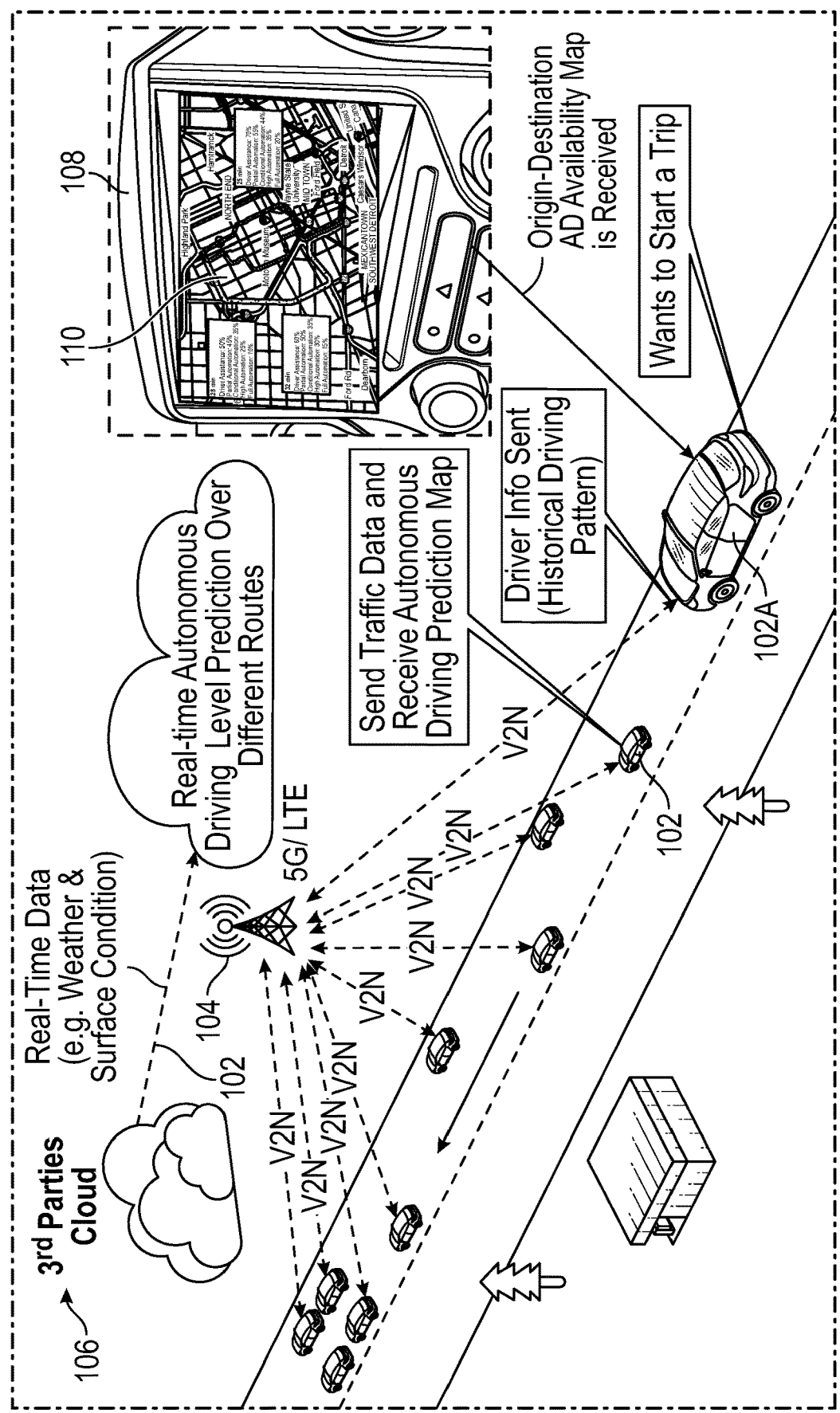
FIG. 1 shows a system for gathering real-time and historical data to enable route selection as informed by autonomous driving predictions in accordance with one or more embodiments of the disclosure.

FIG. 1 shows a system for gathering real-time and historical data to enable route selection as informed by autonomous driving predictions in accordance with one or more embodiments of the disclosure. A cloud service 100 collects data from various real-time and historical resources. Vehicles 102 may transmit real-time traffic data and driver information over a network 104 to the cloud service 100, which uses the data to form historical per-driver driving patterns. The network 104 may be a cellular network or another type of wireless network (for example satellite). Some of the network 104 may be included in the Internet or may have connectivity thereto. Third party clouds 106 may provide the cloud service 100 with other real-time data such as weather and road-surface condition data. The cloud service 100 uses the historical data to train an inference engine or artificial intelligence (AI) module. Some of the historical training data may be labeled with information that is predictive of autonomous driving levels, for instance past levels of autonomy associated with pieces of training data, braking information, manual disengagement of driver-assist, and so forth.

When a driver of a vehicle 102A intends to start a new trip an on-board computer 108 may transmit the origin and destination for the new trip to the cloud service 100. The on-board computer 108 may also transmit other information, such as an identity of the driver, account information associated with the vehicle and/or driver, an identity of the vehicle, and so forth. The previously-trained AI module of the cloud service 100 may find candidate routes based on the origin and destination (the AI module can also be implemented by the on-board computer 108, and route-finding may be trained into the AI module or the AI module may obtain routes from a separate mapping service). Each candidate route is partitioned into segments. The AI module predicts the most probable level of autonomy for each segment according to input parameters, for example, weather/road data, traffic information, driver identity, etc. The cloud service 100 may generate a map of candidate routes that includes information about predicted or likely autonomous driving levels for each candidate route. The map, including the candidate routes, and the information about predicted autonomous driving may be sent to the vehicle 102A and displayed or presented via a user interface 110, such as a display of the on-board computer 108. Details of systems for implementing the AI module and for predicting optimal levels of driving automation per segment of a route are discussed below with reference to FIGS. 7-10.

Figure 2:
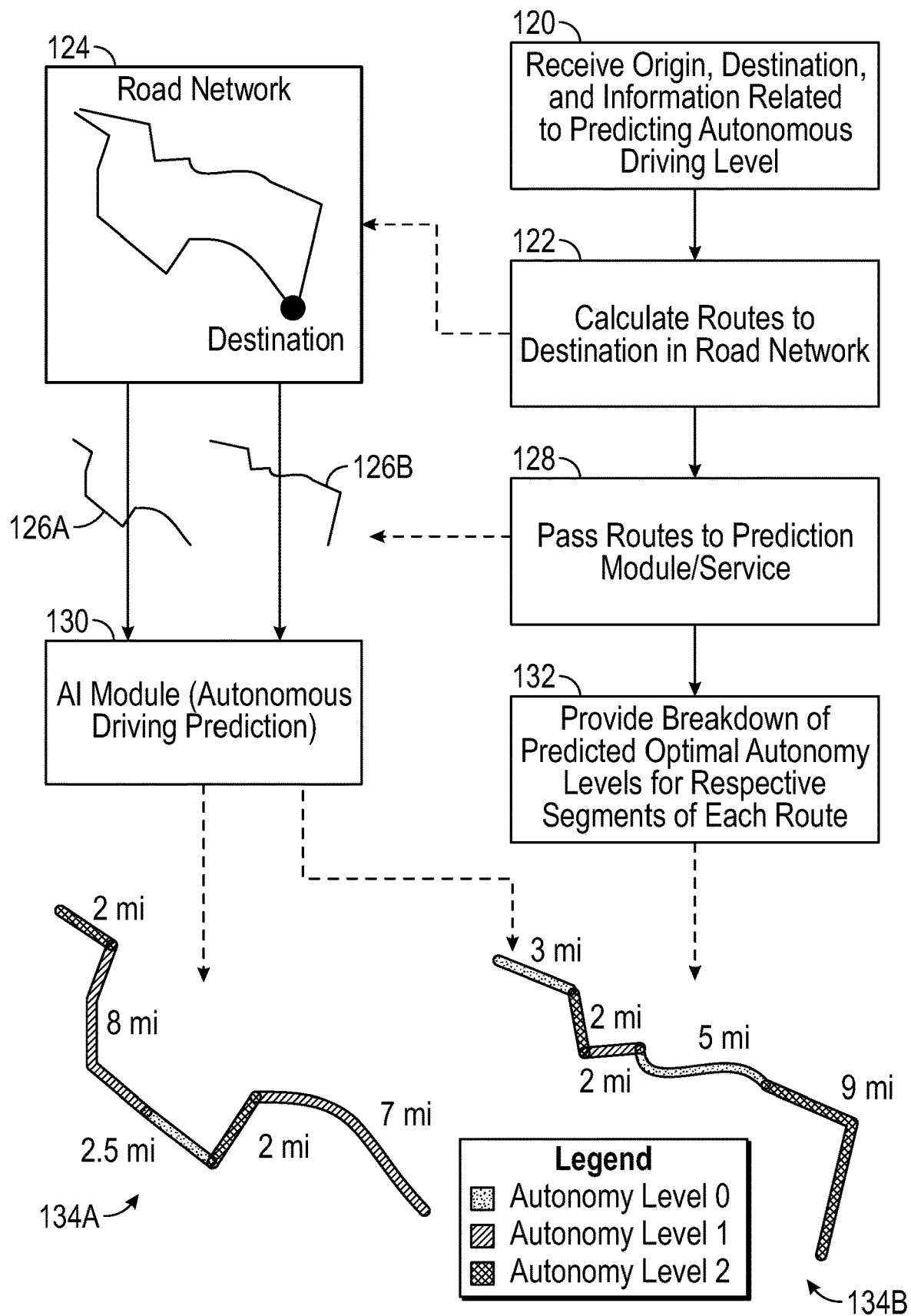
FIG. 2 shows a process for generating a route map that includes predicted autonomous driving information in accordance with one or more embodiments of the disclosure.

FIG. 2 shows a process for generating a route map that includes predicted autonomous driving information. Although the steps discussed with reference to FIG. 2 may be performed by various combinations of computing devices and cloud services, for convenience, the steps will be discussed as being performed by the cloud service 100.

At step 120 the cloud service 100 receives an origin, destination, and information related to predicting autonomous driving levels. At step 122, the cloud service 100 calculates candidate routes, such as candidate routes 126A, 126B, in a road network 124 between the origin and destination. The candidate routes 126A, 126B may be automatically selected from among many potential origin-to-destination routes based on optimization criteria such as travel time, user preferences, driver-specific travel history, etc. At step 128 the candidate routes 126A, 126B and are sent to the previously trained AI module 130.

The AI module 130 processes each candidate route as follows. A candidate route may be partitioned, that is, divided into contiguous segments. Partitioning may be done by the AI module, a pre-processing stage, or both. In one embodiment, through its training, the AI module 130 learns the road segments and does the partitioning implicitly. In another embodiment, a pre-processing module divides the candidate route into segments based on logical divisions such as units of distance, junctures, finding runs of road that have sufficiently similar conditions, etc. Regardless of how partitioning is performed, the AI module 130 predicts the most probable levels of autonomy for the segments in the candidate route. To elaborate, the AI module 130, as per its training, predicts optimal levels of automated driving for the respective segments of the candidate route. In some embodiments, there may be two levels of automation: on, and off. The "on" level may be any degree of autonomy, for example, adaptive cruise control, full autonomy, etc. (other examples are provided below). The level of "none" is full manual driving. In other embodiments, more than two grades or levels of autonomy may be predicted.

In the present example, three levels of autonomy are considered, and the determined probabilities or optimal levels of autonomy for the respective segments are one of the three autonomy levels.

The AI module provides augmented candidate routes 134A, 134B. The augmented candidate routes 134A, 134B are the candidate routes 126A, 126B, but with information indicating the levels of predicted or optimal automation for the respective segments of the two candidate routes. Indications of predicted levels of autonomy may be incorporated as metadata in the candidate routes or may be separate data items linked by respective segment-identifiers or the like. At step 132, the augmented candidate routes 134A, 134B are provided to the vehicle for presentation to the user.

Figure 3:
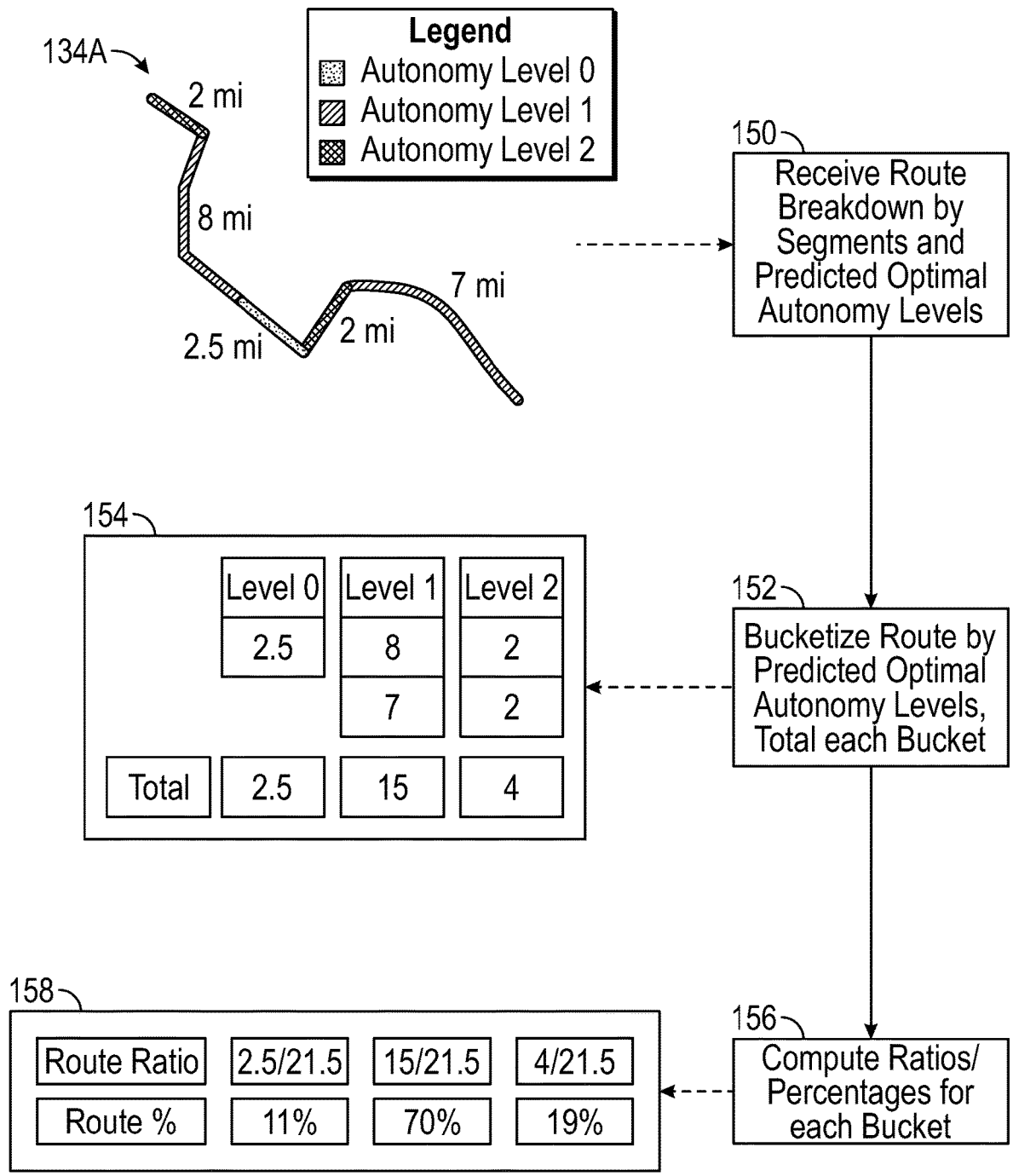
FIG. 3 shows a method for computing ratios of automated driving for a road network route in accordance with one or more embodiments of the disclosure.

FIG. 3 shows a method for computing ratios of automated driving for a road network route. At step 150, a route, for example, candidate route 134A, with predicted automation levels for segments thereof is received. At step 152 the segments are placed in buckets corresponding to their predicted automation levels. If, for instance, there are three levels of predicted automation, then segments with the first level (for example, Level-0) are put in a first bucket 153, segments with the second level (for example, Level-1) are put in a second bucket 155, and segments with the third level (for example, Level-2) are put in a third bucket 157. At step 156, ratios 158 for each respective level/bucket are computed. The ratios 158 may be computed several ways. Ratios may computed based on segment distances. For instance, a total distances for the segments in each respective bucket are computed. For instance, if the first level has one segment of 2.5 miles, the total is 2.5 miles. If the second level has two segments of 8 and 7 miles, respectively, the total for the second level is 15 miles. Similarly, if the third level has two segments of 2 miles each, the total for the third level is 4 miles. A ratio for each level is computed by dividing the total distance for a level by the total distance of the route. As per the example above, the first level has a ratio of 11%, the second level has a ratio of 70%, and the third level has a ratio of 19%.

Ratios for the levels may instead be based on estimated travel times for the segments. With this approach, a travel time is estimated for each bucket of segments. The travel time for a segment may be estimated based on estimated speeds, speed-limits, historical per-driver or population-averaged speeds, or the like. The speeds and distances of the segments are used to compute travel times for the segments, and in turn, the total travel times for the respective buckets/levels. Alternatively, travel times may be obtained directly from historical data. In either case, the ratios for the automation levels are computed by dividing the total travel times for the levels by the total route travel time. Another approach to measuring ratios of automation levels is to use a combination of distance and time, for instance using weighted combinations.

The automation ratios for a candidate route may be sent to the requesting vehicle for presentation to the user with the associated candidate route. In this manner, with multiple candidate routes presented, the user may compare the candidate routes based on the ratios. In another embodiment, as discussed below, rather than presenting ratios, scalar values such as times or distances of automation levels may be returned instead.

Figure 4:
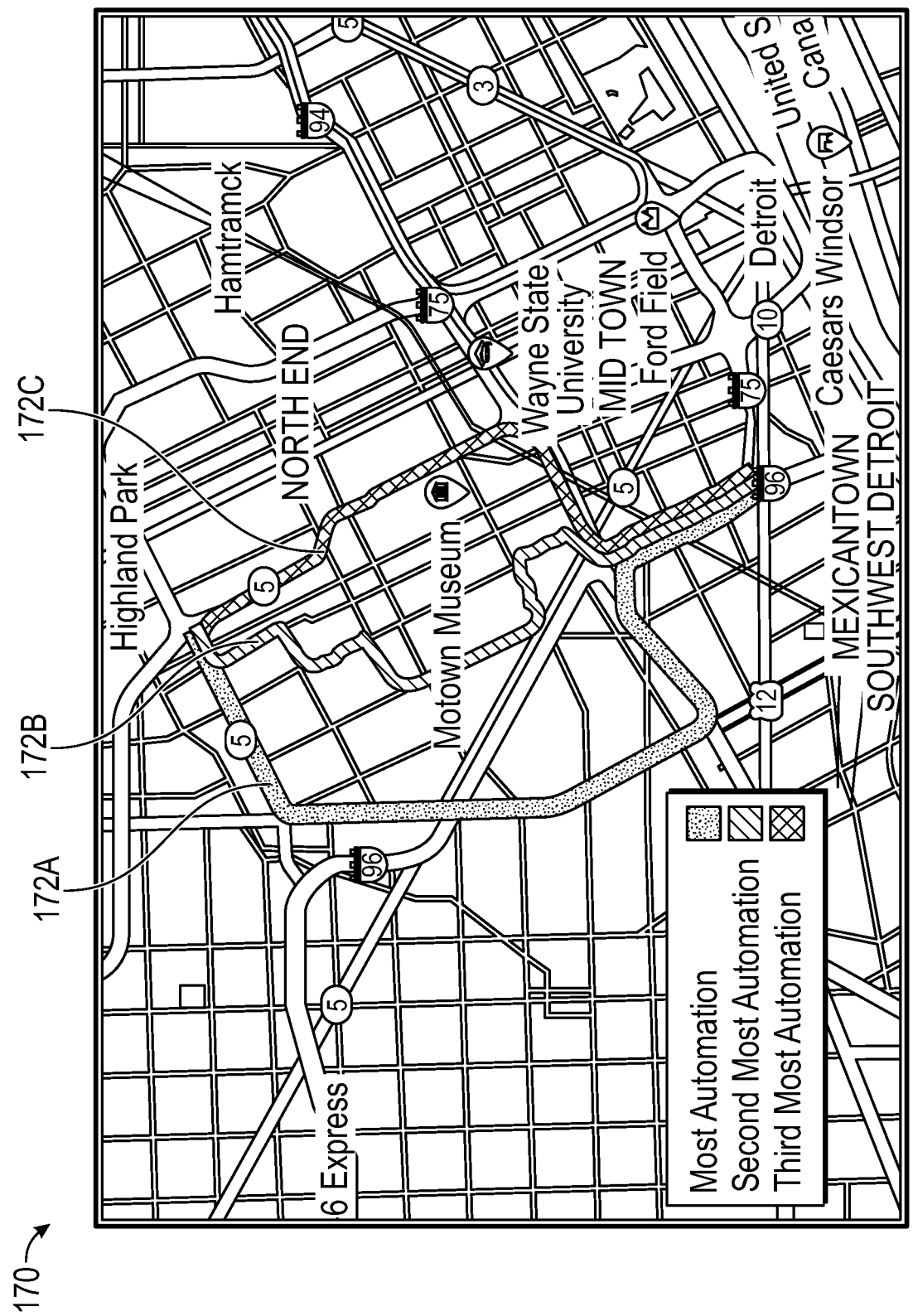
FIG. 4 shows an example user interface for displaying information about driver automation ratios for candidate routes in accordance with one or more embodiments of the disclosure.

FIG. 4 shows an example user interface 170 for displaying information about driver automation ratios for candidate routes. In the example of FIG. 4, the ratio information is displayed as part of the graphic paths 172A-172C for the respective candidate routes. For instance, a legend may be displayed indicating the ranking of the candidate routes according to their ratios of automation. The example of FIG. 4 may be suitable when the two or more levels of automation are predicted (for example, some and none). Ranking may instead be indicated by brightness levels of the graphic paths, thickness, color, opacity, or combinations of such presentation attributes, etc. If there are at least two non-off levels of automation (for example, partial and full), ranking may be performed by treating all levels of non-off automation as a single automation level, by giving greater weight to a specific automation level (where weighted combinations are used), etc.

Figure 5:
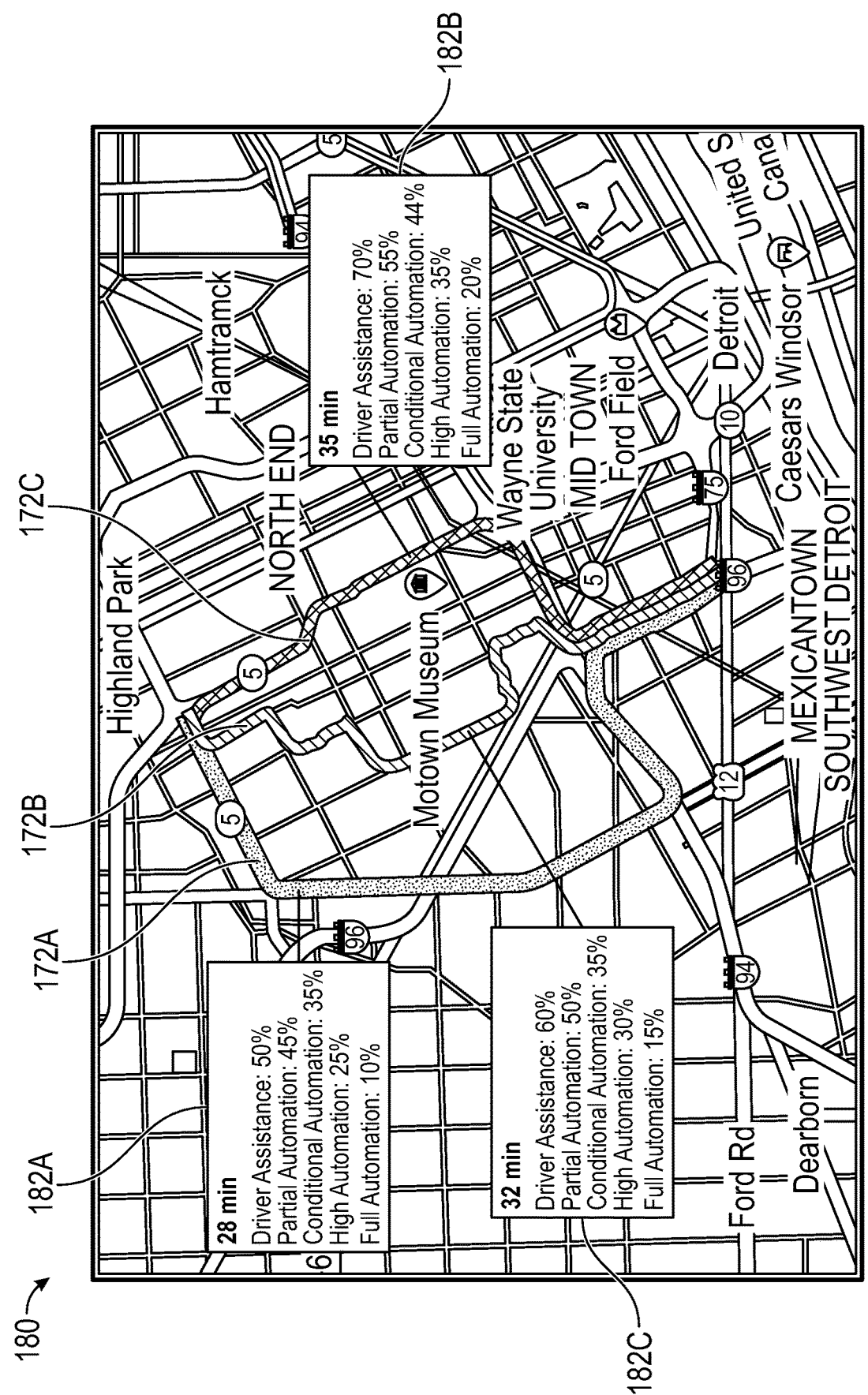
FIG. 5 shows another example user interface for displaying information about predicted automation levels of candidate routes in accordance with one or more embodiments of the disclosure.

FIG. 5 shows another example user interface 180 for displaying information about predicted automation levels of candidate routes 172A-172C. In this embodiment, the user interface 180 includes information boxes 182A-182C. The information boxes 182A-182C may include ordinary route-related information such as travel times. They may also include text indicating the aforementioned ratios of driving automation for the respective candidate routes. For example, information box 182C recites "Driver Assistance: 50%," which may indicate a percentage of the route predicted to have some form of driver assistance. The information may be conveyed in other formats. For example, the predicted total times and/or distances of each automation level for each candidate route may be displayed. A pie chart with slices corresponding to the ratios may be used. In another embodiment, the degree of automation levels for the candidate routes may be conveyed in the graphic paths of the candidate routes. For example, segments of a candidate route may be brightened, colored, thickened, textured, etc. to indicate the automation levels predicted for the segments of the candidate route.

Figure 5A:
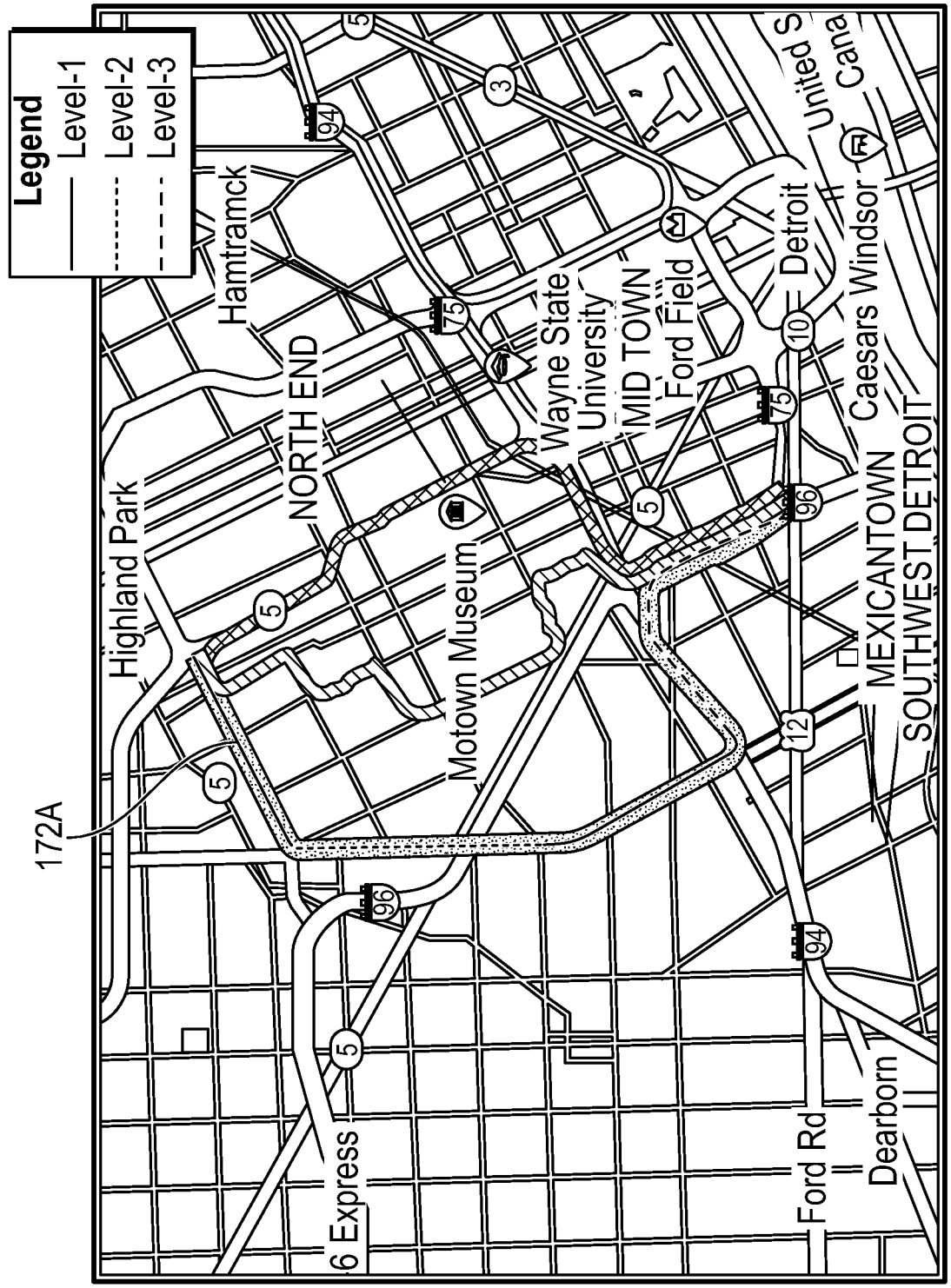
FIG. 5A shows another example user interface in accordance with one or more embodiments of the disclosure.

Figure 5A shows another example user interface 180A according to one or more embodiments. Because predicted automation levels may be known for specific segments of a candidate route, the predicted segment-wise automation levels may be indicated in the user interface 180A. The segments in the example of FIG. 5A are displayed to indicate automation levels with respective line patterns, however colors may be used instead of patterns. Another approach is to indicate (by color or pattern) whether any automation is predicted for a given segment of a candidate route. With either approach, the appearance of segments along routes may be updated based on changes in predicted automation availability. If more than one automation level is available on a segment, a representative color or pattern may be displayed for the highest automation level only (meaning that all automation levels below that level are also available).

Another approach is to allow a user interaction (e.g., a touch) with a graphic indication of an automation level, for example the level indications in box 182C in FIG. 5. In response, only that selected automation level is shown on the map, for example on any displayed routes. That is, the suggested routes on the map are converted to the color or appearance of one automation level only (wherever available). So, for example, if "Full Automation" in box 182C is selected by a user, then any segments on any routes where "Full Automation" is available is changed to the corresponding color appearance and the rest of the segments (those segments with unavailable full automation) will be white (or any other color). Then similarly, by clicking on another automation level in Box 182C, the color or pattern is changed to show the segments available for that automation level.

Any of the user interface features discussed above may be combined, for example combinations of text, graphics, and interactive functions may be used.

Overview of Automated Driving Prediction

FIG. 6 shows an overview of an embodiment of a system for predicting automation levels, which is described in more detail with reference to FIGS. 7-10. Training input data is collected separately for each road segment in a road network. Specifically, for each segment, historical driving behavior data 190 and features 192 related to driving are collected, for example vehicle-to-vehicle (V2X) traffic data, road geometric conditions, weather, road surface, etc. (see discussion of FIGS. 7-10 for more examples). The training input data is used to train a machine learning module, for example, an inference engine 194. The trained inference engine 194 communicates with a prediction plugin 196 (e.g., a cloud service/module). The prediction plugin 196 may be a trained model stored and used for real-time prediction. Prediction may be performed in the cloud or in a vehicle's computing device. In the latter case, after the model is trained in the cloud, the trained model is sent to the vehicles' computing devices, thus allowing prediction to be done for each vehicle separately.

When a driver or mapping application requests new routes or route updates, in addition to sending the origin and destination, the vehicle or mapping application may send real-time data corresponding (parametrically) to the historical data (or a subset thereof), for instance the identity of the driver, feature vectors corresponding to the training vectors (that is, feature vectors as mentioned above and discussed below with reference to FIGS. 7-10). In addition, other sources of real-time data continue to supply the prediction plugin 194 with real-time data such as traffic data, road changes, weather, and the like. For a given request, the prediction plugin 196 generates an output 198 that includes predicted optimal automation levels for the segments of the candidate routes determined from the historical data for the real-time general and drive-specific inputs. Note that the concept of predicted levels of automation discussed herein can also be thought of as AI-derived optimal levels of automation, for example, levels of automation predicted to be most suitable when specific road segments are negotiated by the route-requesting vehicle. See, for instance, the discussion of FIGS. 7-10.

Embodiments described herein may be applied to other forms of transportation, for instance shipping traffic or air traffic. The same principles would apply, although other features would be used to predict optimal automation levels.

While embodiments discussed above employ one or more cloud services, different architectures may be used, and the functional steps discussed above may be performed by different types of components. For example, most if not all of the steps can be performed by a single computing device such as a smartphone or a vehicle's on-board general-purpose computer. Furthermore, the real-time input provided to predict optimal automation levels need not include real-time data that is not specific to a given drive, that is, traffic data, weather data, and the like need not be used. Dynamic input data such as traffic data may be updated incrementally, e.g. hourly. Furthermore, the AI module might be trained only on data such as mostly-static road features such as number of lanes, traffic rules, road geometry, road surface type, traffic signal density, road network density, etc. The techniques for informing a vehicle operator of likely automation-friendliness of a route can be used with any methods for predicting likely levels of automation. Such predictions may be made for a generic driving-automation system assumed to have baseline characteristics.

In another embodiment, the predictions for automated driving levels for candidate routes can also be used to inform whichever optimization algorithm selects candidate routes. That is, when many origin-to-destination routes in a road network are being evaluated as potential candidate routes (the routes ultimately presented to a user for selection via a mapping application), information about predicted automation levels for the potential routes can be computed as discussed above, and those predicted automation levels may be used as one of the route-optimization conditions, thus creating a bias for candidate routes that have higher overall levels of likely automated driving.

Although embodiments and examples discussed above mention multiple origin-to-destination candidate routes being displayed for user-selection at the onset of a new trip, the information and user interfaces relating to predicted route automation levels can be used for only a single route. Moreover, the same techniques may be used for an in-progress route. When a vehicle is underway and presumably following a selected route, the vehicle's current location may be sent to the cloud service (or functional equivalent), the current route may be updated, and the mapping application interface may be updated to reflect any changes in predicted levels of automation in the remaining portion of the route (which might also change due to changes in traffic conditions, weather, etc.). In other words, the predicted automation level information displayed to a vehicle operator may be updated in real-time and possibly based on new real-time input data such as traffic, weather, etc. Thus, the term "origin" as used herein includes not only the starting point of a trip but the current location of a vehicle in transit to a destination.

Systems for Automated Driving Prediction

Embodiments of the systems discussed above for predicting optimal automated driver levels are discussed next with reference to FIGS. 7-10.

Figure 7:
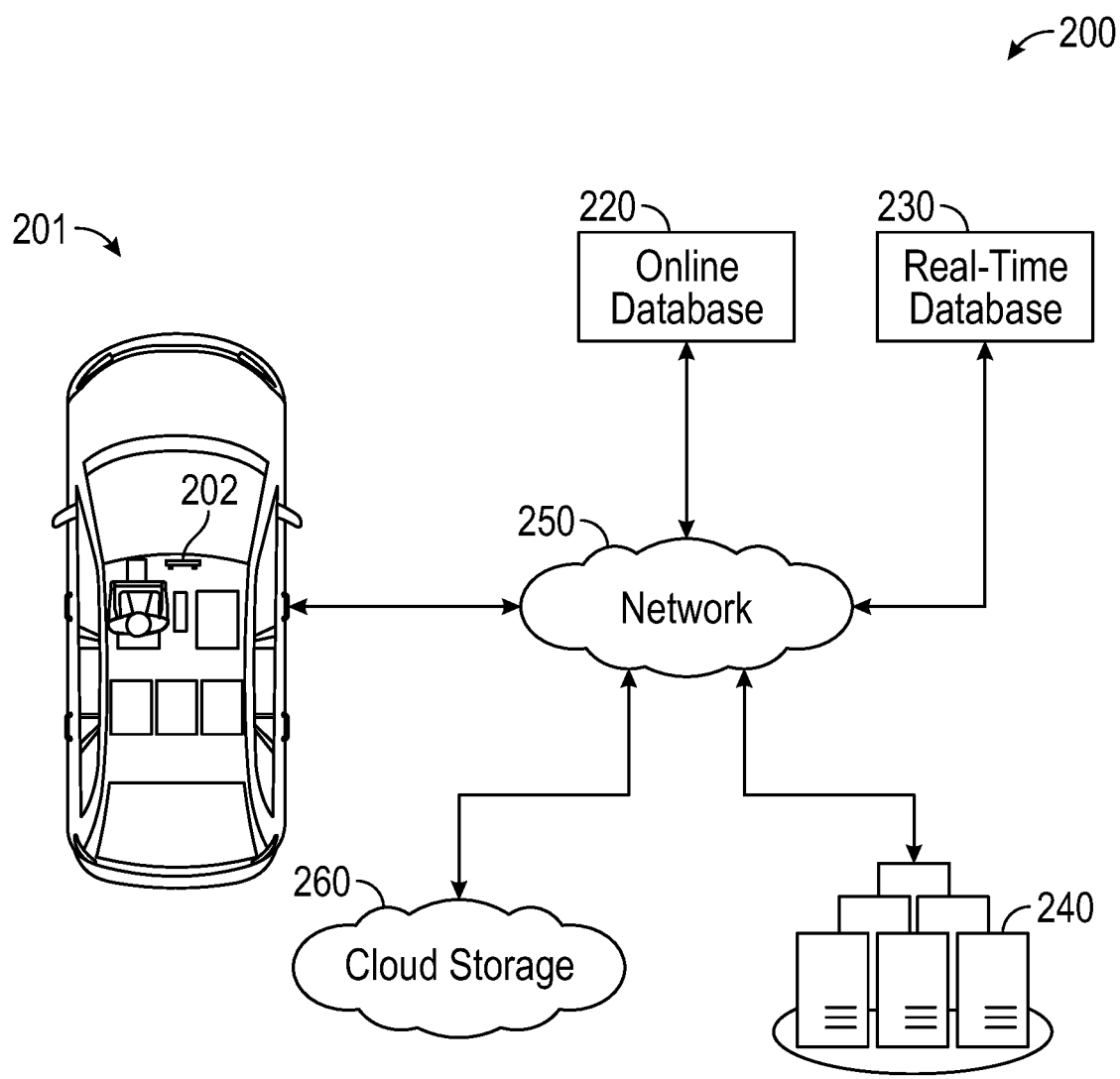
FIG. 7 shows a driver assist optimization prediction system in accordance with one or more embodiments of the disclosure.

FIG. 7 shows a driver assist optimization prediction system 200. System 200 is one possible implementation of the AI module 130 and the combined inference engine 194 and prediction plugin 196. System 200 may include a vehicle 201 having a control module 202 operatively coupled to a GPS system and to a Driver Assistance (DA) system, for example, a driver assist system, of vehicle 201, online database 220, and real-time database 230, all communicatively coupled to the driver assist optimization prediction platform 200 via, for example, a network 250 (which may be similar to the network 104 of FIG. 1). The driver assist optimization prediction platform 200 may be located on one or more servers, for example, stored on cloud 260 or on control module 202.

The vehicle 201 may be a manually driven vehicle (for example, no autonomy) and/or configured and/or programmed to operate in a fully autonomous (for example, driverless) mode (for example, Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, driver assist optimization prediction platform 200 may be configured and/or programmed to operate with a vehicle having a Level-1, Level-2, Level-3, Level-4, or Level-5 autonomous vehicle controller.

The control module 202 of the vehicle 201 may store driver behavior data, for example, data indicative of how a particular driver of the vehicle 201 drives under specific road conditions. For example, a driver may tend to decelerate abruptly when another vehicle changes lane in front of the vehicle 201, and/or the driver may tend to switch lanes abruptly when there are many other vehicles on the road segment, and/or the driver may drive slower when it is raining, when the road is curvy, and/or when the road surface is slippery. Accordingly, the control module 202 may be customized for individual drivers of the vehicle 201. In addition, the control module 202 may communicate with the GPS system of the vehicle 201 such that the control module 202 may communicate location data of the vehicle 201 to the driver assist optimization prediction platform 200.

The online database 220 may be any online database providing historical road condition data for a given road segment as described in further detail below. For example, the historical road condition data may include historical traffic data, historical weather data, historical accident data, historical surface condition data and/or historical road geometry data. Traffic data may include data indicative of, for example, average vehicle speed, number of vehicles, frequency of lane changing, and interactions between vehicles for a given road segment. Moreover, road geometry data may include data indicative of, for example, type of road, road shape, number of lanes, and lane width of a given road segment.

The real-time database 230 may be any online database providing real-time road condition data for a given road segment, for example, the road segment the vehicle 201 is approaching and/or driving on. For example, the real-time road condition data may include real-time traffic data, real-time weather data, real-time accident data, real-time surface condition data and/or real-time road geometry data.

The network 250 may include any one, or a combination of networks, such as a local area network (LAN), a wide area network (WAN), a telephone network, a cellular network, a cable network, a wireless network, and/or private/public networks, such as the Internet. For example, the network 250 may support communication technologies, such as TCP/IP, Bluetooth, cellular, near-field communication (NFC), Wi-Fi, Wi-Fi direct, machine-to-machine communication, man-to-machine communication, and/or visible light communications.

Some or all portions of the wireless communication link that supports communications between driver assist optimization prediction platform 200 and a communication device, such as a router, for example, that may be included in network 250, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Information shared between the driver assist optimization prediction platform 200, the control module 202, the online database 220, and the real-time database 230 may be stored on the cloud storage 260 and may be bi-directional in nature. For example, in one case, driver assist optimization prediction information, for example, historical driver behavior and road condition data may be transferred from driver assist optimization prediction platform 200 to cloud storage 260. Such information stored on cloud storage 260 may be accessed and used by control module 202, e.g., various smart vehicles.

Figure 8:
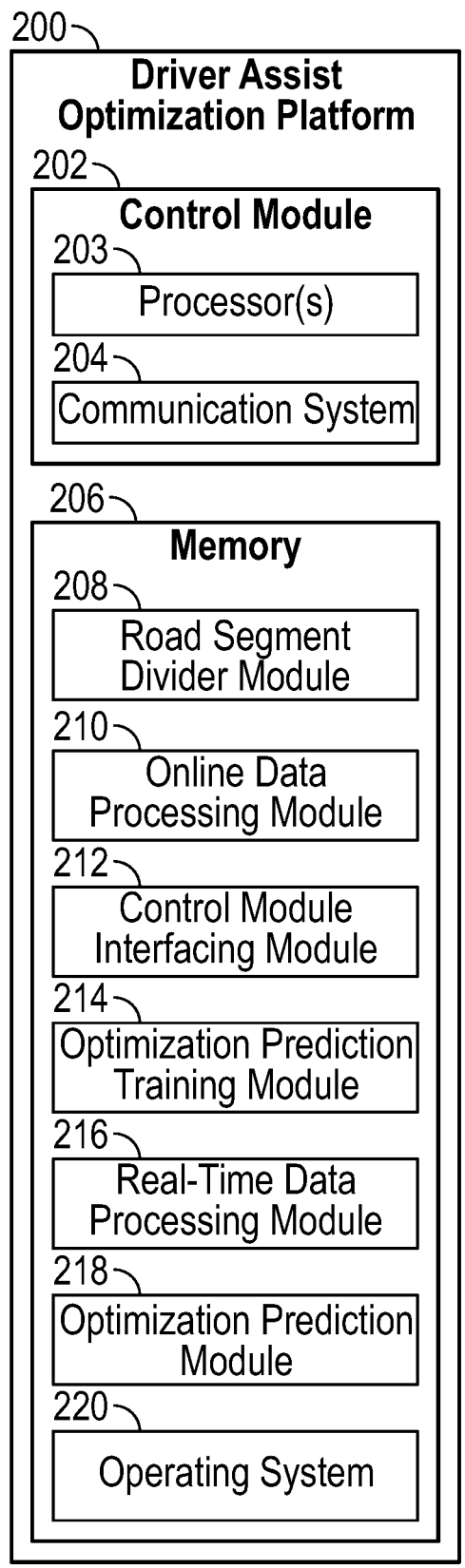
FIG. 8 shows components that may be included in the driver assist optimization prediction platform in accordance with one or more embodiments of the disclosure.

FIG. 8 shows components that may be included in the driver assist optimization prediction platform 200. Driver assist optimization prediction platform 200 may include one or more processors 203, communication system 204, and memory 206. Communication system 204 may include a wireless transceiver that allows driver assist optimization prediction platform 200 to communicate with control module 202 of vehicle 201, online database 220, real-time database 230, and cloud storage 260. The wireless transceiver may use any of various communication formats, such as, for example, an Internet communications format, or a cellular communications format.

Memory 206, which is one example of a non-transitory computer-readable medium (not a signal), may be used to store operating system (OS) 220, road segment divider module 208, online data processing module 210, control module interfacing module 212, optimization prediction training module 214, real-time data processing module 216, and optimization prediction module 218. The modules are provided in the form of computer-executable instructions that may be executed by processor 203 for performing various operations in accordance with the disclosure.

Road segment divider module 208 may be executed by processor 203 for dividing a road segment, for example, roadway, into a plurality of road segments, such that historical driver behavior and road condition data may be collected for each road segment of the plurality of road segments. For example, the roadway may be divided into road segments based on length, for example, every 0.5 to 1 mile. Alternatively, the roadway may be divided based on where the road type of the road segment changes, for example, a first straight portion of a roadway may be a first road segment, a curved portion of the roadway may be a second road segment, and a second straight portion of the roadway may be a third road segment. Moreover, a portion of the roadway having two lanes may be one road segment, whereas a portion of the roadway having three lanes may be another road segment.

Online data processing module 210 may be executed by processor 203 for communicating with online database 220. Accordingly, online data processing module 210 may receive and process historical road condition data from online database 220.

Control module interfacing module 212 may be executed by processor 203 for communicating with control module 202 of vehicle 201. For example, control module interfacing module 212 may receive location data of vehicle 201 via a GPS system operatively coupled to control module 202 to determine the geographical location of vehicle 201. Moreover, control module interfacing module 212 may receive historical and real-time driver behavior data from control module 202, for example, for an individual driver of vehicle 201. In addition, control module interfacing module 212 may transmit an alert to the driver assist system of vehicle 201 via control module 202 as described in further detail below, such that the driver assist system may take the appropriate optimization action.

Optimization prediction training module 214 may be executed by processor 203 for training an optimization prediction model, for example, via machine learning or artificial intelligence, based on the historical driver behavior and road condition data for a given road segment. Accordingly, the optimal use of using a driver assist system such as adaptive cruise control may be calculated based on previous instances of decreased optimal use of a driver. Thus, the optimization prediction model described herein may be trained via optimization prediction training module 214 to discover the patterns and relationships in the historical data, more specifically, to identify those types of driver behaviors and road conditions (for example traffic data, roadway type and geometric conditions, weather conditions, surface condition, etc.) that will likely lead to, for example, decreased optimal use. Copied below is a general function of the optimization:

$$[\![ \text{Optimization} ]\!]\_(\text{driver } i) = f(x\_1, x\_2, \ldots, x\_n)$$

In this function, given all the conditions on the road and driver's behavior, $[\![ \text{Optimization} ]\!]\_(\text{driver } i)$ is the probability that the driver i will have to $[\![$ decelerate severely, to turn off the driver assist system and control the vehicle manually.

x_1 to x_n are all the variables including the driver's behaviors (history of driving in the past and real-time behavior), traffic flow characteristics (for example average speed, number of vehicles, frequency of lane changing, interactions between vehicles, etc.), roadway geometric conditions (for example, type of road, road shape, number of lanes, lane width, etc.), weather and road surface conditions, etc. the driver's past driver behavior may include the driver's acceleration and deceleration patterns and frequency of distraction by the driver in each type of road condition (for example, number of times the driver violated the lanes by tracking their lane keeping system record).

Real-time data processing module 216 may be executed by processor 202 for communicating with real-time database 230. Accordingly, real-time data processing module 216 may receive and process real-time road condition data from real-time database 230.

Optimization prediction module 218 may be executed by processor 203 for predicting an optimal use level of a driver assist system using the optimization prediction model and real-time driver behavior and road condition data. Accordingly, in the future, when similar driving behaviors and road conditions occur on a road segment, optimization prediction module 218 may input the real-time driver behavior and road condition data into the optimization prediction model to predict the associated optimal use for the driver using the driver assist system.

Figure 9:
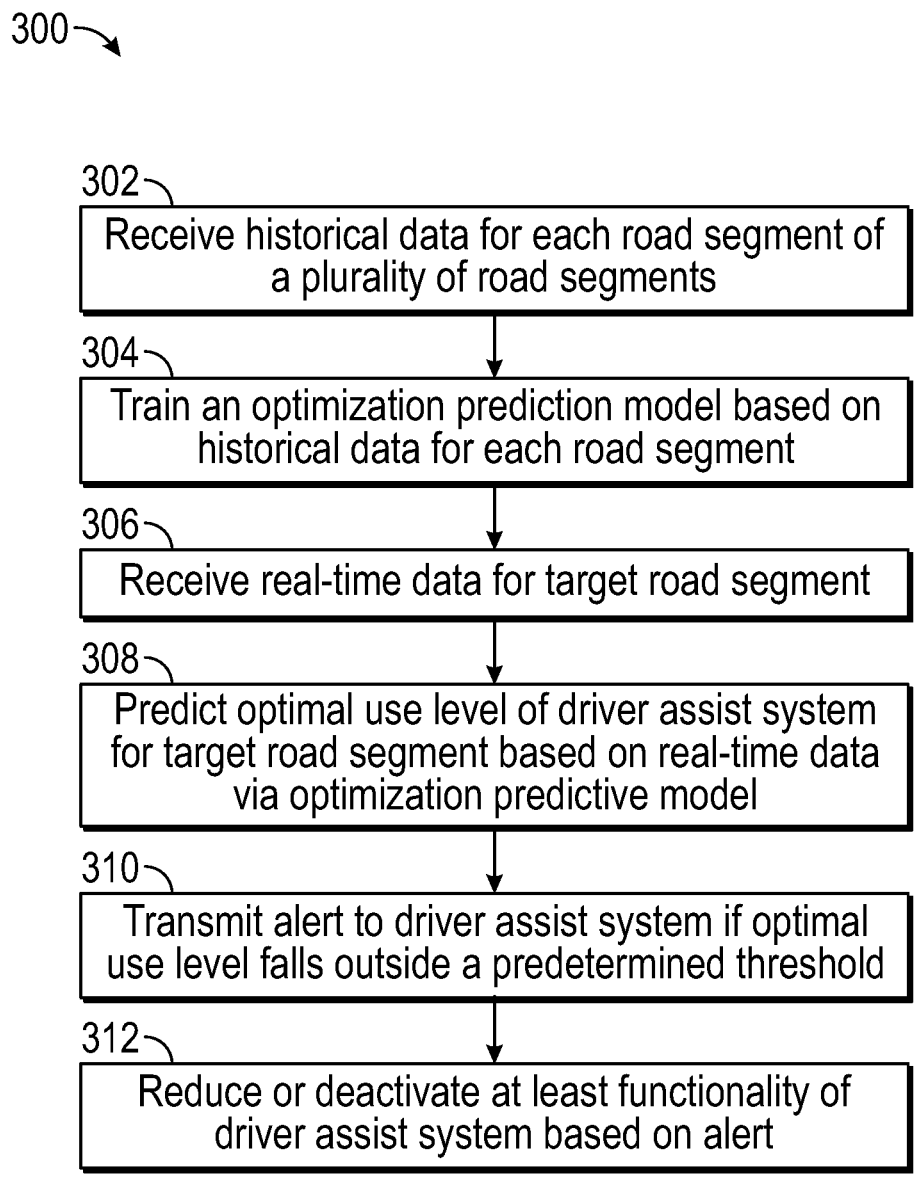
FIG. 9 shows an exemplary method for predicting an optimal use level of a driver assist system in accordance with one or more embodiments of the disclosure.

FIG. 9 shows an exemplary method 300 for predicting an optimal use level of a driver assist system. At step 302, driver assist optimization prediction platform 200 may receive historical data for each road segment of a roadway, for example, as divided by road segment divider module 208. For example, online data processing module 210 may receive historical road condition data from online database 220, and control module interfacing module 212 may receive historical driver behavior data from control module 202 for an individual driver for a given road segment.

At step 304, optimization prediction training module 214 may train an optimization prediction model, e.g., via machine learning or artificial intelligence, based on the historical driver behavior and road condition data for each road segment. At step 306, driver assist optimization prediction platform 200 may receive real-time data for a target road segment, e.g., the road segment that vehicle 201 is approaching or driving on. For example, real-time data processing module 216 may receive real-time road condition data from real-time database 230, and control module interfacing module 212 may receive real-time driver behavior data from control module 202, e.g., the identity of the driver of vehicle 201.

At step 308, optimization prediction module 218 may predict an optimal use level of the driver assist system for the target road segment by inputting the real-time driver behavior and road condition data into the trained optimization prediction model. The predicted optimal use level may be compared with a predetermined threshold for the driver assist system stored in a database, e.g., in memory 206 or cloud 260, to determine whether the predicted optimal use level falls outside the predetermined threshold. If the predicted optimal use level falls outside the predetermined threshold, at step 310, control module interfacing module 212 may transmit an alert to the driver assist system via control module 202. Accordingly, at step 312, the driver assist system may reduce or deactivate at least one functionality of the driver assist system based on the alert.

Figure 10:
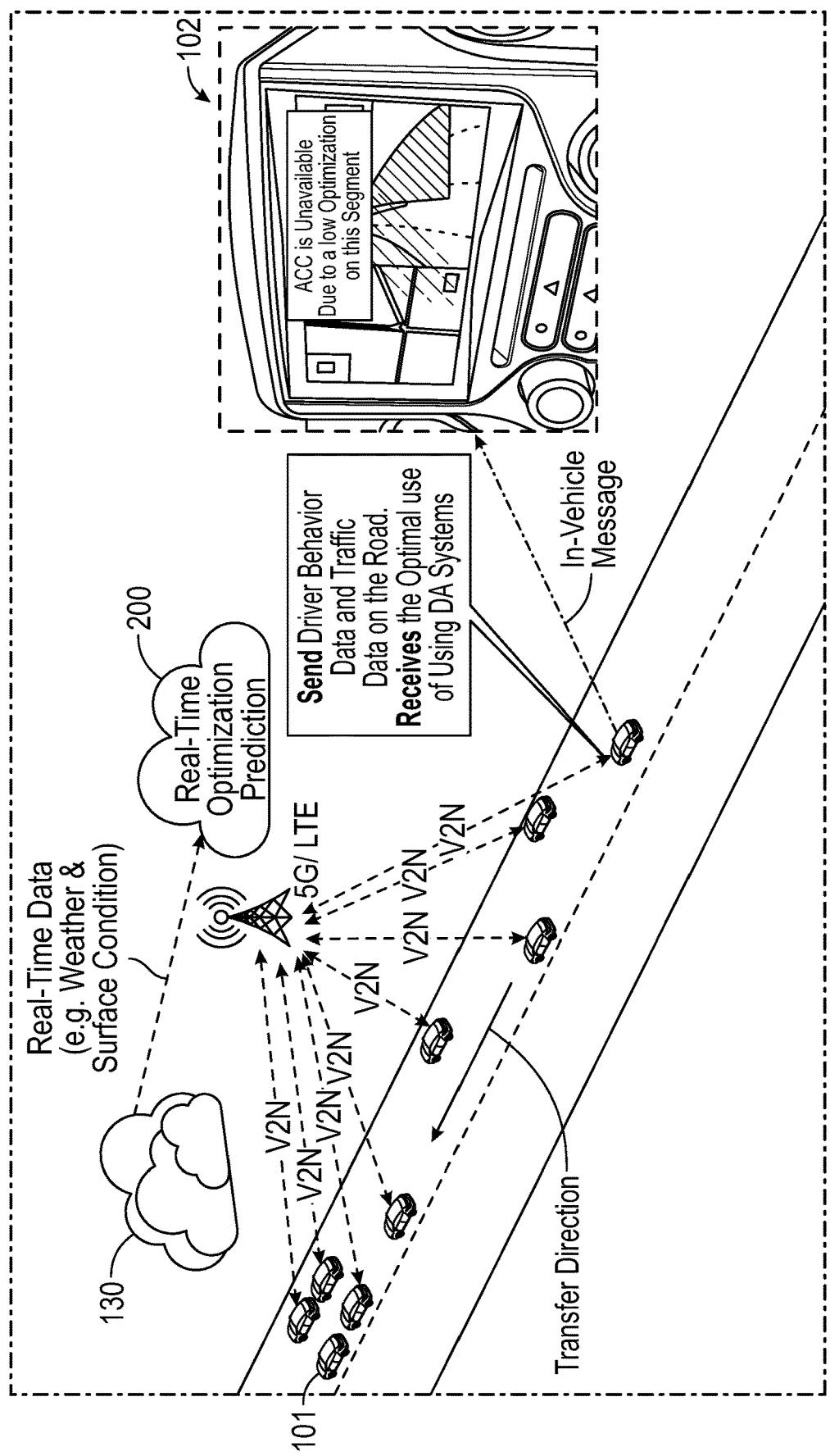
FIG. 10 shows an exemplary application of the driver assist optimization prediction platform in accordance with one or more embodiments of the disclosure.

FIG. 10 shows an exemplary application of the driver assist optimization prediction platform 200. As shown in FIG. 10, driver behavior data and traffic data (e.g. average speed, number of vehicles, frequency of lane changing, etc.) may be frequently collected through the V2X communication system from multiple vehicles on the road, whether they use a driver assist system or not. The optimal use level value associated with the driver assist system may then be predicted for the drivers. The optimal use value may then be sent back to the vehicle and if it is determined to fall outside a predetermined threshold, the driver assist system will be disabled, or at least partially reduced in functionality. If the driver wants to start using the driver assist system or is already using it, a message may be displayed on a graphical user interface of control module 202, for example, SYNC, to inform the driver that the driver assist system is temporary unavailable due to the optimal use level falling outside a predetermined threshold, as shown in FIG. 10. The optimal use level of the driver assist system may be calculated and updated in real-time such that the system may be available as soon as the optimal use level improves. As will be understood by a person having ordinary skill in the art, the optimization prediction model may be tuned for each automation level system (driver assist system, partial automation, conditional automation, etc.) separately.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such labels or phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method comprising:
receiving a road network route to a destination;
providing the road network route to an inference engine, wherein the inference engine comprises an artificial-intelligence (AI) learning module, and wherein the method further comprises training the AI learning module with:
historical driving behavior data, comprising manual disengagement(s) of one or more autonomous features supported by a vehicle; and
features, comprising portions of road-segment data respectively corresponding to the segments of the route in the road network;
predicting, by the inference engine, a first level of autonomous driving for respective segments of the road network route, wherein the first level of autonomous driving provides a first set of autonomous features supported by the vehicle;
based on the predicted first level of autonomous driving for the respective segments, determining a first ratio of autonomous driving time or autonomous driving distance for the road network route;
displaying a user interface comprising a graphic representation of the road network route and a graphic indication of the first ratio;
sending real-time data to the inference engine for a target road segment of the respective segments, wherein the real-time data comprises real-time driver behavior data for a driver of the vehicle;
predicting a driver-specific optimal use level of autonomy for the target road segment, based at least in part on the real-time data;
determining the driver-specific optimal use level falls outside of a predetermined threshold; and
responsive to the determination that the driver-specific optimal use level falls outside of the predetermined threshold, reducing or deactivating at least one functionality of the first set of autonomous features.

2. The method according to claim 1, further comprising:
receiving a second predicted level of autonomous driving for the respective second segments of the road network route, wherein the second predicted level of autonomous driving for the respective second segments are generated by the inference engine based on the real-time data;
based on the second predicted level of autonomous driving for the respective segments, computing a second ratio of autonomous driving time or autonomous driving distance; and
wherein the user interface comprises a graphic indication of the second ratio.

3. The method according to claim 1, further comprising:
receiving a second road network route to the destination;
predicting, by the inference engine, a second level of autonomous driving for respective second segments of the second road network;
based on the predicted second level of autonomous driving for the respective second segments, determining a second ratio of autonomous driving time or autonomous driving distance for the second road network route; and
wherein the displayed user interface further comprises a graphic representation of the second road network route and a graphic indication of the second ratio that is displayed simultaneously with the graphic representation of the road network route and the graphic indication of the first ratio.

4. The method according to claim 3, wherein the user interface responds to a selection of either road network route by displaying driving instructions corresponding to the selected road network route.

5. The method according to claim 1, wherein the graphic representation of the first road network route comprises sections displayed according to the predicted first level of autonomous driving.

6. The method according to claim 1, wherein the displaying is performed by a display that is part of a vehicle, wherein the vehicle comprises sensors and an autonomous driving system configured to drive the vehicle at the levels of autonomy according to sensor data from the sensors, and wherein the level of autonomy for at least one of the respective segments is predicted by the inference engine when the least one of the respective segments is out of range of the sensors.

7. The method according to claim 1, wherein the predicted first level of autonomous driving corresponds to a level of at least partial autonomous driving.

8. An apparatus comprising:
a computing device comprising storage hardware and processing hardware, the storage hardware storing instructions that when executed by the processing hardware cause the processing hardware to perform a process, the process comprising:
providing an indication of a route in a road network to an artificial-intelligence (AI) module, wherein the AI learning module is trained with:
historical driving behavior data, comprising manual disengagement(s) of one or more autonomous features supported by a vehicle; and
features, comprising portions of road-segment data respectively corresponding to the segments of the route in the road network;
generating first associations comprising associations between respective first segments of the route in the road network and a first optimal level of autonomy for an assistive driving (AD) system predicted for the first segments by the AI module, wherein the first optimal level of autonomy corresponds to a first set of autonomous features supported by the vehicle;
generating second associations comprising associations between respective second segments of the route in the road network and a second optimal level of autonomy for the AD system predicted for the second segments by the AI module, wherein the second optimal level of autonomy corresponds to a second set of autonomous features, further wherein the first segments and second segments are mutually exclusive portions of the route in the road network;
computing a first value based on the first associations;
computing a second value based on the second associations;
providing a user interface comprising a map of the route in the road network, a graphic indication representing the first value, and a graphic indication representing the second value;
sending real-time data to the AI module for a target road segment of the respective first segments, wherein the real-time data comprises real-time driver behavior data for a driver of the vehicle;
predicting a driver-specific optimal use level of autonomy for the target road segment, based at least in part on the real-time data;
determining the driver-specific optimal use level falls outside of a predetermined threshold; and
responsive to the determination that the driver-specific optimal use level falls outside of the predetermined threshold, reducing or deactivating at least one functionality of the first set of autonomous features.

9. The apparatus according to claim 8, wherein the first value comprises a first ratio and the second value comprises a second ratio.

10. The apparatus according to claim 8, wherein the AI module predicts the optimal levels of the first and second segments based on training data comprising portions of historical data respectively corresponding to the first and second segments, wherein each segment's optimal level is predicted based on a respective portion of historical data specific to the segment.

11. The apparatus according to claim 8, wherein each association between an optimal level of autonomy and a segment corresponds to the level of autonomous driving of the AD system that the AI module predicts is most likely to be optimal when the vehicle, comprising the AD system, negotiates the corresponding segment with the AD system active.

12. The apparatus according to claim 8, wherein the process is performed in association with enabling a user to select the route before initiating a new trip with a mapping application.

13. The apparatus according to claim 8, wherein the process is performed after the vehicle, comprising the AD system, has begun traveling the route in the road network, and wherein the displaying further comprises updating the map as the vehicle travels the route in the road network.

14. Computer-readable storage hardware storing information that, when executed by processing hardware, causes the processing hardware to perform a process, the process comprising:
  sending a route in a road network to an artificial-intelligence (AI) module, wherein the AI learning module is trained with:
    historical driving behavior data, comprising manual disengagement(s) of one or more autonomous features supported by a vehicle; and
    features, comprising portions of road-segment data respectively corresponding to the segments of the route in the road network;
  based on the route in the road network, predicting, by the AI module, autonomous driving levels for respective segments of the route in the road network, the predicted autonomous driving levels generated by the AI module based on route in the road network;
  providing a user interface comprising a map, the map comprising a representation of the route in the road network, the user interface further comprising a graphic comprising a value based on the predicted autonomous driving levels for the respective segments
  sending real-time data to the AI module for a target road segment of the respective segments, wherein the real-time data comprises real-time driver behavior data for a driver of the vehicle;
  predicting a driver-specific optimal use level of autonomy for the target road segment, based at least in part on the real-time data;
  determining the driver-specific optimal use level falls outside of a predetermined threshold; and
  responsive to the determination that the driver-specific optimal use level falls outside of the predetermined threshold, reducing or deactivating at least one functionality of the first set of autonomous features.

15. The computer-readable storage hardware according to claim 14, the value comprising a percentage of time or distance during which, according to the predicted autonomous driving levels and the segments, one of the autonomous driving levels is predicted to be optimal according to training of the AI module.

16. The computer-readable storage hardware according to claim 14, wherein the value comprises a distance.

17. The computer-readable storage hardware according to claim 14, wherein the value comprises a time.

18. The computer-readable storage hardware according to claim 14, wherein the graphic representation of the route in the road network comprises sections corresponding to the segments, and wherein the sections are displayed based on the predicted autonomous driving levels of the respective sections.

19. The computer-readable storage hardware according to claim 14, wherein the process is performed while the vehicle is displaying the map and also traveling on the route in the road network.

* * * * *